United States Patent [19]

Ishikawa

[11] Patent Number: 5,155,585
[45] Date of Patent: Oct. 13, 1992

[54] IMAGE PICKUP APPARATUS FOR RECEIVING LIGHT AND CONVERTING TO AN ELECTRICAL SIGNAL CORRESPONDING TO THE LIGHT

[75] Inventor: Yujiro Ishikawa, Toyota, Japan

[73] Assignee: Brother Kogyo Kabushiki Kaisha, Nagoya, Japan

[21] Appl. No.: 736,693

[22] Filed: Jul. 26, 1991

[30] Foreign Application Priority Data

Aug. 13, 1990 [JP] Japan ................ 2-214099
Aug. 17, 1990 [JP] Japan ................ 2-217956

[51] Int. Cl.⁵ .............................................. H04N 9/04
[52] U.S. Cl. ................................... 358/42; 358/98
[58] Field of Search .............. 358/41, 42, 98, 55, 358/58, 75; 128/4, 6

[56] References Cited

U.S. PATENT DOCUMENTS

| | | | |
|---|---|---|---|
| 4,523,224 | 6/1985 | Longacre, Jr. | 358/42 |
| 4,587,564 | 5/1986 | Dischert | 358/42 |
| 4,862,253 | 8/1989 | English et al. | 358/98 |
| 4,909,600 | 3/1990 | Ciarlei et al. | 358/42 |
| 4,926,247 | 5/1990 | Nagasaki et al. | 358/41 |
| 4,998,163 | 3/1991 | Salvati | 358/42 |
| 5,046,162 | 9/1991 | Ishikawa et al. | 358/42 |

Primary Examiner—Edward L. Coles, Sr.
Assistant Examiner—Kim Yen Vu
Attorney, Agent, or Firm—Oliff & Berridge

[57] ABSTRACT

An image pickup apparatus receives light on image sensing elements and generates an electrical signal corresponding to integrals of luminances thereon with respect to time and outputs the electrical signal to an A/D converter. A disk shaped color filter unit, having red, green, and blue color filters with the same sectorial shape, is rotated so the color filters are respectively disposed on the optical path of light falling on the image sensing elements. A control unit monitors the magnitude of a digital signal converted by the A/D converter and controls the filter moving unit based on the magnitude of digital signal so that the color filter is rotated at a higher rotating speed when the illumination of the environment is higher. Further, the control unit controls the color filter moving unit so that the color filter is rotated at a first speed n, when a color image signal generating mode is set, and controls the color filter moving unit so that the color filter is moved at a second speed 3n times the first speed when a black-and-white image signal generating mode is set.

15 Claims, 13 Drawing Sheets

Fig.6B

| ITEM | INSTRUCTIONS |
|---|---|
| STEP1 | OUTPUTTING SIGNAL FOR SELECTING THE GROUP SIGNALS(2) |
| STEP2 | DETECTING CONDITION OF THE SETTING KEY 27 |
| STEP3 | COLOR IMAGE SIGNAL GENERATING MODE |
| STEP4 | MONITORING THE MAGNITUDE OF THE DIGITAL SIGNAL |
| STEP5 | COMPARING THE MAGNITUDE OF THE CURRENT DIGITAL SIGNAL WITH THE MAGNITUDE OF THE DISCRIMINATING DATA |
| STEP6 | DISCRIMINATING THE LIGHT INTENSITY DATA CORRESPONDING TO THE OVERFLOW RANGE |
| STEP7 | OUTPUTTING SIGNAL FOR SELECTING THE GROUP SIGNALS(3) |
| STEP8 | DISCRIMINATING THE LIGHT INTENSITY DATA CORRESPONDING TO THE HIGH RANGE |
| STEP9 | OUTPUTTING SIGNAL FOR SELECTING THE GROUP SIGNALS(2) |
| STEP10 | DISCRIMINATING THE LIGHT INTENSITY DATA CORRESPONDING TO THE LOW RANGE |
| STEP11 | OUTPUTTING SIGNAL FOR SELECTING THE GROUP SIGNALS(1) |
| STEP12 | MONITORING THE MAGNITUDE OF THE DIGITAL SIGNAL |
| STEP13 | COMPARING THE MAGNITUDE OF THE CURRENT DIGITAL SIGNAL WITH THE MAGNITUDE OF THE DISCRIMINATING DATA |
| STEP14 | DISCRIMINATING THE LIGHT INTENSITY DATA CORRESPONDING TO THE OVERFLOW RANGE |
| STEP15 | OUTPUTTING SIGNAL FOR SELECTING THE GROUP SIGNALS(6) |
| STEP16 | DISCRIMINATING THE LIGHT INTENSITY DATA CORRESPONDING TO THE HIGH RANGE |
| STEP17 | OUTPUTTING SIGNAL FOR SELECTING THE GROUP SIGNALS(5) |
| STEP18 | DISCRIMINATING THE LIGHT INTENSITY DATA CORRESPONDING TO THE LOW RANGE |
| STEP19 | OUTPUTTING SIGNAL FOR SELECTING THE GROUP SIGNALS(4) |

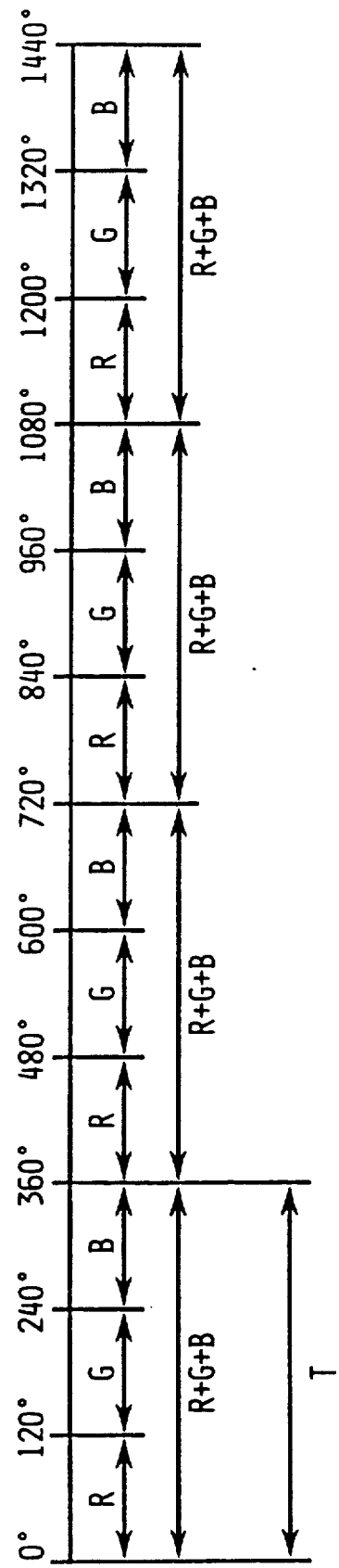

IMAGE PICKUP APPARATUS FOR RECEIVING LIGHT AND CONVERTING TO AN ELECTRICAL SIGNAL CORRESPONDING TO THE LIGHT

BACKGROUND OF THE INVENTION

1. Field of the Invention

The present invention relates to an image pickup apparatus and more particularly to an image pickup apparatus for receiving light including image information and producing an electrical signal corresponding to the intensity of the light.

2. Description of the Related Art

As shown in FIG. 8, a conventional image pickup apparatus 50 for receiving light including image information and producing electrical signals corresponding to the light is provided in its front portion with a lens system 51. A charge coupled device (hereinafter abbreviated to "CCD") 53, which is formed of solid-state image pickup elements, is disposed at the focal point of the lens system 51 on which the image of an object 52 is focused.

If the CCD 53 is a linear image sensor of a rectangular shape, as shown in FIG. 11, the CCD 53 is provided with a linear arrangement of image pickup elements 56 having a width w on the order of 10 μm that are linearly arranged parallel to the longer axis of the rectangular shape facing toward the lens system 51. A filter unit 54 is disposed between the lens system 51 and the CCD 53 on an optical path 52a. As shown in FIG. 9, the filter unit 54 comprises a circular filter holding disk 55 holding a red filter 55R, a green filter 55G, and a blue filter 55B arranged at equal angular intervals, a shaft 54C joined to the central portion of the filter holding disk 55, and a step motor 57 coupled with the shaft 54C (FIG. 8). The step motor 57 rotates the shaft 54C to locate the filters 55R, 55G and 55B selectively on the optical path 52a.

As shown in FIG. 8, the CCD 53 is electrically connected to an analog-to-digital converter (hereinafter the analog-to-digital converter is referred as "A/D converter") 58, which converts analog signals output by the CCD 53 into corresponding digital signals. A storage device 59, which is electrically connected to the A/D converter 58, stores digital signals output by the A/D converter 58. A control circuit 60 is electrically connected to the CCD 53, the A/D converter 58, the step motor 57, and the storage device 59 in order to control their operation as described below.

The control circuit 60 drives the step motor 57 to rotate the shaft 54C so as to locate the red filter 55R on the optical path 52a to focus the red image component of the object on the CCD 53. The control circuit 60 controls the CCD 53 so that the CCD 53 outputs a signal representing the quantity of light received, i.e., the integral of the luminance on the CCD 53 in the fixed time. The analog signal output by the CCD 53 is converted into a corresponding digital signal by the A/D converter 58 and the digital signal is stored in the storage device 59. Thus, the red image data of the object is read by the image pickup apparatus 50.

The step motor 57 is driven for rotation of the shaft 54C through an angle of 120° over a fixed time as controlled by the control circuit 60 so that the red filter 55R, the green filter 55G and the blue filter 55B are respectively located on the optical path 52a and held on the optical path 52a for a fixed time. Hereinafter, the foregoing procedure will be referred to as an image pickup procedure.

Referring to FIG. 12, if a time T required for turning the filter holding disk 55 through an angle of 120° coincides with a time T in which the CCD 53 is charged, namely, an integral time (hereinafter the time will often be referred to as read time), red, green and blue image data can be acquired while the filter holding disk 55 is turned one full turn, namely, through an angle of 360°. The angular phase of the filter holding disk 55 is measured to the right on the horizontal axis, and the angular phase of the filter holding disk 55 is 0° when the boundary line L between the red filter 55R and the blue filter 55B (FIG. 9) is in alignment with the CCD 53. Since the filter holding disk 55 is rotated at a fixed rotating speed, the horizontal axis indicating the angular phase may be regarded as a time-base axis.

The green and blue image data of the object 52 are read by the same procedure as that for reading the red image data, and digital signals corresponding to the green and blue image data are stored in the storage device 59 as digital green and blue image data. The digital red, green and blue image data stored in the storage device 59 is sent through an interface IF to an external device (not shown), which includes devices such as a microprocessor.

The image pickup apparatus 50 as described has a disadvantage in that the apparatus 50 requires a comparatively long time for reading the red, green and blue image data because the filters 55R, 55G and 55B are turned through a fixed angle over a fixed, long period of time regardless of the illumination level of environment and, in particular, in the case of high illumination.

If the image pickup apparatus 50 is used for reading a black-and-white image, the filter holding disk 54 is held stationary with one of the filters 55R, 55B, and 55G. For example, the green filter 55G is located in front of the CCD 53 on the optical path 52A to focus a green image on the CCD 53. Thus, the white image data is substituted by the green image data. Accordingly, the gradations between black and white images of the object cannot be discriminated clearly from each other because of the single color filter effect.

Another conventional image pickup apparatus, as shown in FIG. 10, employs a CCD 61 having a plurality of image pickup elements 61A covered respectively with red filters 62R, green filters 62G and blue filters 62B. This image pickup apparatus, however, has a disadvantage in that the resolution thereof is ⅓ that of the image pickup apparatus 50 because ⅓ of the image pickup elements 61A of the CCD 61 are assigned to each of the red, green and blue images, respectively.

SUMMARY OF THE INVENTION

It is an object of the present invention to overcome the foregoing disadvantages and to provide an image pickup apparatus capable of reading an image in a comparatively short read time and having a high resolution.

Another object of the present invention is to provide an image pickup apparatus capable of accurately reading black-and-white images as well as color images.

In one aspect of the present invention, an image pickup apparatus comprises: an image pickup means for receiving light thereon and for generating electric signals corresponding to integrals of luminances of the light with respect to time and for outputting the electric signals; a color filter unit including at least two different color filters which are respectively disposed on an optical path of light falling on the image sensing elements; a moving means for moving the color filter relative to the image sensing elements to locate the color filter sequentially on the optical path; and a control means for controlling the moving means to vary the moving speed of the color filter based on the illumination of the environment.

The image pickup means outputs the electric signals corresponding to the integrals of luminances thereon with respect to time. The color filter moving means locates the color filters sequentially on the optical path of light falling on the image sensing elements and the control means controls the filter moving means based on the illumination of the environment so that the color filter unit is moved at a higher moving speed when the illumination of the environment is higher.

Thus, the image pickup apparatus, in accordance with the present invention, is capable of shortening the image reading time based on the illumination of the environment and, at the same time, has a high resolution.

In another aspect of the present invention, an image pickup apparatus comprises: an image pickup means for receiving light thereon and for generating electric signals corresponding to integrals of luminances of the light with respect to time and for outputting the electric signals; a color filter unit including red, green, and blue color filters which are respectively disposed on the optical path of light falling on the image sensing elements; a moving means for moving the color filter relative to the image sensing elements to locate the color filter sequentially on the optical path; a mode setting means for setting one of a color image signal generating mode and a black-and-white image signal generating mode; and a control means for controlling said moving means so that the color filter unit is moved at a first speed n when the color image signal generating mode is set by the mode setting means and the color filter unit is moved at a second speed 3n (n is a positive integer) times the first speed when the black-and-white image signal generating mode is set by the mode setting means.

Suppose that this image pickup apparatus reads each color image for a time T for integration to generate a color image signal by rotating the color filters at the first speed n. If the color filters are rotated at a speed three times (3n) the first speed, each of the red, green and blue filters is located at the working position once in the time T for integration in which the color filters are turned one full turn and, consequently, a monochromatic image produced by mixing the red, green and blue images falls on the image sensing elements. Thus, the black and white images are discriminated accurately from each other and other color images can accurately be received.

BRIEF DESCRIPTION OF THE DRAWINGS

The foregoing and other objects, features and advantages of the present invention will become more apparent by reading the following detailed description of the preferred embodiments of the invention, when considered in connection with the accompanying drawings, in which:

FIGS. 6A and 6B are a flowchart and a table, respectively, of the operation of the image pickup apparatus of the second embodiment;

FIG. 7 is a diagram of the production of a monochromatic image by adding and mixing red, green and blue images using the second embodiment;

DETAILED DESCRIPTION OF THE PREFERRED EMBODIMENTS

Figure 1:
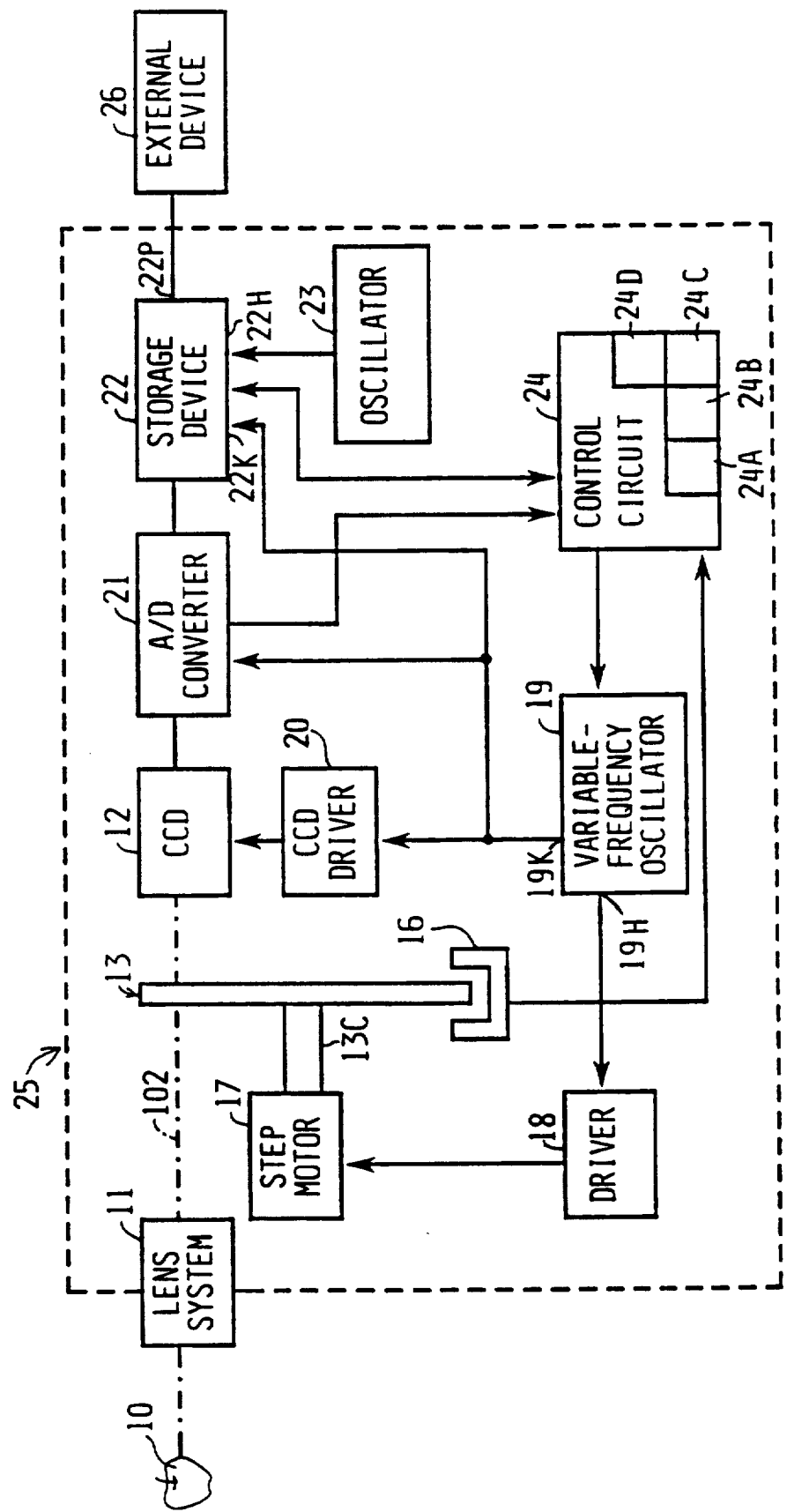
FIG. 1 is a block diagram of a first embodiment of an image pickup apparatus.

Referring to FIG. 1, a first embodiment of the image pickup apparatus 25 of the invention has a lens system 11 disposed at its front portion and a CCD 12 which functions as image pickup means, disposed behind the lens system 11. The lens system 11 comprises a plurality of lenses (not shown). The positions of the lenses of the lens system 11 are adjusted to focus the real image of an object 10, at an optional distance from the lens system 11, on the CCD 12.

Figure 3:
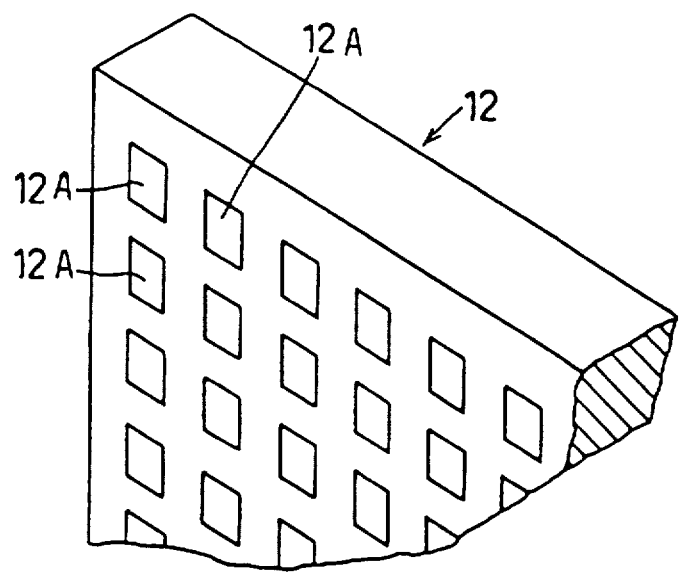
FIG. 3 is a fragmentary perspective view of an image pickup device comprising a large number of image sensing elements.

FIG. 3 is an enlarged view showing the several hundred thousand image sensing elements 12A of the CCD 12 arranged in lines and columns at regular intervals. The CCD 12 receives light on the image sensing elements 12A and generates electric signals corresponding to integrals of luminances with respect to time and outputs electric signals. Therefore, optical data of the object 10, focused on the image sensing elements 12A, is converted into corresponding electric signals.

Figure 2:
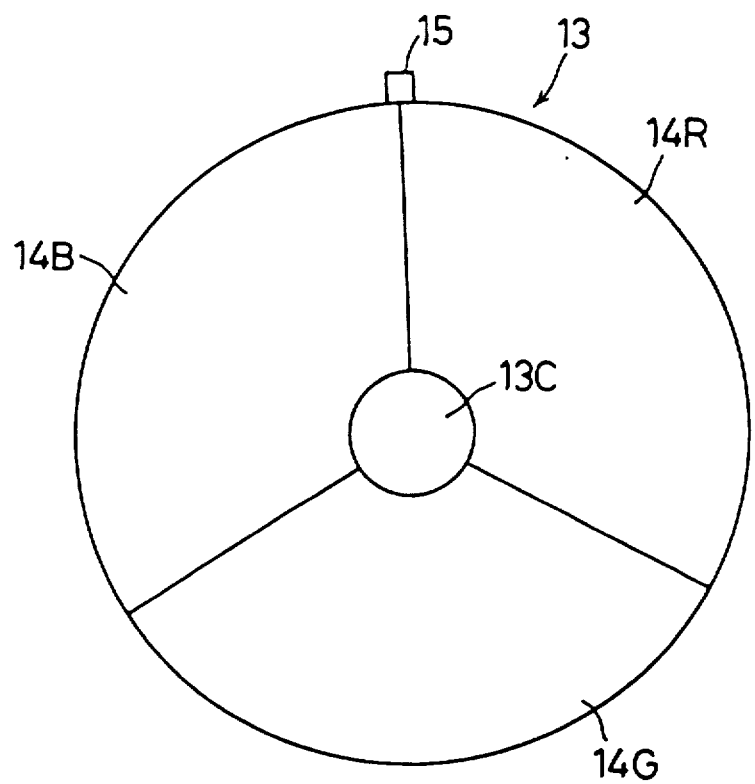
FIG. 2 is a plan view of a color filter unit employed in the image pickup apparatus of FIG. 1.

A color filter unit 13 is disposed between the lens system 11 and the CCD 12. As shown in FIG. 2, the color filter unit 13 is disk shaped and comprises a red filter 14R, a green filter 14G and a blue filter 14B having the same sectorial shape. The color filter unit 13 is supported on a shaft 13C for rotation about the axis of the shaft 13C. The color filter unit 13 is turned to locate the filters 14R, 14G and 14B sequentially, between the lens system 11 and the CCD 12, on an optical path 10A. The shaft 13C is coupled with the output shaft (not shown) of a step motor 17 which functions as a moving means. An interior space of the image pickup apparatus 25 is enclosed by a black shading wall (not shown).

A magnet 15 for detection of the rotating speed of the color filter unit 13 is attached to the circumference of the color filter unit 13 on a boundary between the red filter 14R and the blue filter 14B as shown in FIG. 2. A Hall-effect integrated circuit (hereinafter referred to as a "Hall IC") 16 is disposed near the circular path of the magnet 15. The Hall IC 16 generates a pulse on the basis of a detection of the magnet 15 every time the magnet 15 crosses the Hall IC 16. The number of pulses generated by the Hall IC 16 in a fixed time interval corresponds to the rotating speed of the color filter unit 13.

The image pickup apparatus 25 is provided with a control circuit 24 for controlling operation of the components of the image pickup apparatus 25. The control circuit 24 functions as a control means. The Hall IC 16 is electrically connected to the control circuit 24 and a pulse string generated by the Hall IC 16 is applied to the control circuit 24 for monitoring the rotating position of the color filters unit 13. The control circuit 24 stores rotating position data of the filters 14R, 14G, and 14B as described below. The rotating position data of the filters 14R 14G, and 14B are formed of standard position data, corresponding to the position of the boundary between the red filter 14R and the blue filter 14B, and distance data, representing distances of the filters 14R 14G, and 14B from the boundary along a circumference of the color filter unit 13.

A variable-frequency oscillator 19 is electrically connected to the control circuit 24 so that the variable-frequency oscillator 19 can output signals of a number of frequencies under control of the control circuit 24 as described below. One output terminal 19K of the variable-frequency oscillator 19 is electrically connected to a CCD driver 20 so that a signal output by the oscillator 19 is input to the CCD driver 20. An analog-to-digital converter (hereinafter the analog-to-digital is referred as "A/D converter") 21 is electrically connected to the CCD 12 so that a string of analog signals output by CCD 12 is converted to a string of a digital signals sequentially.

The A/D converter 21 is electrically connected to the terminal 19K of the oscillator 19 so that the signal output by the oscillator 19 is input to the A/D converter 21 for controlling the A/D conversion of the A/D converter 21. The A/D converter 21 is electrically connected to the control circuit 24 so that the signal output by the oscillator 19 is input to the control circuit 24 for monitoring the digital signals. The A/D converter 21 is electrically connected to a storage device 22 so that a string of the digital signals, as a read data, output by the A/D converter 21 is input to the storage device 22 on the basis of a write clock described below. A write clock terminal 22K of a storage device 22 is electrically connected to the oscillator 19 so that the signal, as the write clock, output at the terminal 19K of the oscillator 19 is input to the storage device 22 for controlling the writing operation of the storage device 22.

The CCD driver 20 drives the CCD 12 based on the frequency of a signal applied thereto through the output terminal 19K of the variable-frequency oscillator 19. That is, the higher the frequency of a signal applied through the output terminal 19K to the CCD driver 20, the higher the speed of operation of the CCD 12. The A/D converter 21 executes an A/D conversion operation based on the frequency of the signal applied thereto through the output terminal 19K of the variable-frequency oscillator 19. That is, the higher the frequency of a signal applied through the output terminal 19K to the A/D converter 21, the higher the speed of the A/D conversion of the AD converter 21. The storage device 22 stores digital signals output by the A/D converter 21 in its storage regions in synchronism with the frequency of a signal applied to the write clock terminal 22K. Therefore, the higher the frequency of a signal applied through the output terminal 19K to the storage device 22, the higher the speed of the writing operation of the storage device 22.

An output terminal 19H of the variable-frequency oscillator 19 is electrically connected to a stepping motor driver 18 so that a signal output at the terminal 19H of the variable-frequency oscillator 19 is input to the driver 18 for driving the step motor 17. The rotating speed of the step motor 17 is determined based on the frequency of a signal applied to the driver 18 through the output terminal 19H of the variable-frequency oscillator 19. Therefore, the increase in frequency of a signal applied through the output terminal 19H to the driver 18 is proportional to the speed of rotation of the step motor 17.

The variable-frequency oscillator 19 outputs one of six kinds of signals with different frequencies, H1[Hz], H2[Hz], H3[Hz](H1[Hz]<H2[Hz]<H3[Hz]), 3*H1[Hz], 3*H2[Hz], 3*H3[Hz] respectively at the terminal 19H of the variable-frequency oscillator 19. The variable-frequency oscillator 19 outputs one of three kinds of signals with different frequencies, K1[Hz], K2[Hz], K3[Hz](K1[Hz]<K2[Hz]<K3[Hz]), respectively at the terminal 19K of the variable-frequency oscillator 19. In this embodiment, the signals with different frequencies 3*H1[Hz], 3*H2[Hz], 3*H3[Hz] are not used. However, the signals with different frequency 3*H1[Hz], 3*H2[Hz], 3*H3[Hz] may be used for controlling the operation of the components of the image pickup apparatus 25 as an alternative embodiment. The variable-frequency oscillator 19 is formed of a well-known crystal oscillator (not shown) and a well-known counter (not shown) for dividing signals output by the crystal oscillator.

Group signals are defined as the signal with the frequency H1[Hz] output at output terminal 19H and the signal with the frequency K1[Hz] output at output terminal 19K simultaneously (hereinafter the group signals are referred to as the Group signals (x), where x=1,2,3, 4,5,6). Group signals (2) are defined as the signal with the frequency H2[Hz] output at output terminal 19H and the signal with the frequency K2[Hz] output at output terminal 19K simultaneously. Group signals (3) are defined as the signal with the frequency H3[Hz] output at output terminal 19H and the signal with the frequency K3[Hz] output at output terminal 19K simultaneously. Group signals (4) are defined as the signal with the frequency 3*H1[Hz] output at output terminal 19H and the signal with the frequency K1[Hz] output at output terminal 19K simultaneously. Group signals (5) are defined as the signal with the frequency 3*H2[Hz] output at output terminal 19H and the signal with the frequency K2[Hz]output at output terminal 19K simultaneously. Group signals (6) are defined as the signal with the frequency 3*H3[Hz] output at output terminal 19H and the signal with the frequency K3[Hz] output at output terminal 19K simultaneously.

The output terminal of an oscillator 23, Which generates a signal of a fixed frequency, is electrically connected to the read clock terminal 22H of the storage device 22. Data stored in the storage device 22 is read in synchronism with the frequency of the signal applied to the read clock terminal 22H, and then the read data is sent to an external device 26 which is electrically connected to the output terminal 22P of the storage device 22. The storage device 22 is capable of operating at a read speed different from a write speed. Memory TMS4C 1050 and 1060, supplied by Texas Instruments Corporation, are representative of such a storage device.

The control circuit 24 controls the speed of operation of the step motor 17, the CCD 12, the A/D converter 21 and the storage device 22 on the basis of the frequency of the signal output by the variable-frequency oscillator 19. The control circuit 24 includes CPU 24A for controlling the control circuit 24, RAM 24B for storing various data to control the control circuit 24, ROM 24C for storing data, such as the standard position data and the distance data, a discriminating data as described below, and the program to control the control circuit 24 and I/0 port 24D.

The control circuit 24 detects the area of the filters 14R, 14G, and 14B of the color filter unit 13 based on input of the Hall IC 16, the rotating position data of the filters 14R, 14G, and 14B and the rotating speed of the color filter unit 13 for discriminating the filters 14R, 14G, and 14B of the color filter unit 13

The control circuit 24 monitors the magnitude of the digital signal output by the A/D converter 21 to obtain light intensity data representing the light intensity of a currently received image.

Figure 4:
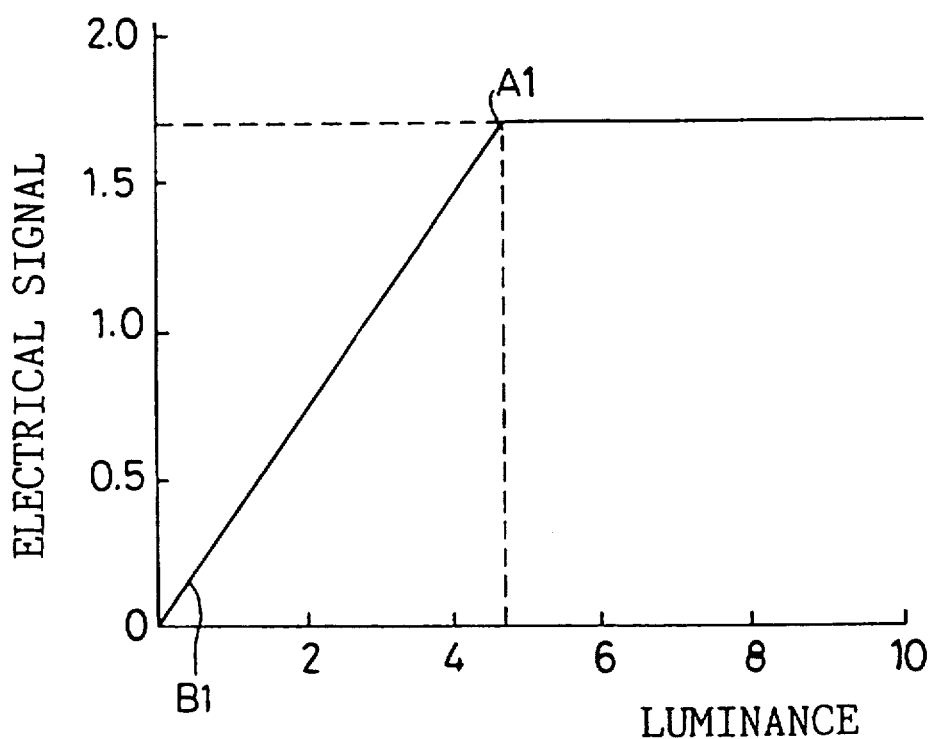
FIG. 4 is a graph showing the photoelectric conversion characteristics of the image sensing elements of FIG. 3.

As shown in FIG. 4, the photoelectric conversion characteristics of the CCD 12 are that the variation of the current of the output analog signal of the CCD 12 is proportional to the intensity of the incident light, namely, the luminance on the CCD 12, in a linear range of luminance and that the current of the output signal of the CCD 12 saturates in an overflow range of luminance beyond the linear range. The output current of the CCD 12 is integrated with respect to time for the duration of the incident light.

The overflow range of luminance beyond the linear range, that is, above a point A1 described in FIG. 4 is defined as the overflow range. A part of the linear range of luminance under a point B1 shown in FIG. 4 is defined as a low range. The part of the linear range of luminance between the point A1 and the point B1 is defined as a high range.

The analog signal received from CCD 12 by the A/D converter 21 is converted to a digital signal and the A/D converter 21 outputs the digital signal to the control circuit 24. The control circuit 24 compares the magnitude of the digital signal with signals which represent the points A1 and B1, as the discriminating data previously noted, stored in the ROM 24C. The control circuit 24 discriminates the overflow range based on the magnitude of the signal output by the A/D converter 21 which is larger than that of the signal representing the point A1, discriminates the high range based on the magnitude of the signal output by the A/D converter 21 which is between the point A1 and the point B1, and discriminates the low range based on the magnitude of the signal output by the A/D converter 21 which is smaller than that of the signal representing the point B1.

The control circuit 24 controls the variable-frequency oscillator 19 on the basis of the light intensity data so that the frequency of the signal output by the variable-frequency oscillator 19 is increased when the light intensity is in the overflow range and is decreased when the light intensity is in the low range.

The operation of the step motor 17, the color filter unit 13, the CCD 12, the A/D converter 21 and the storage device 22 will be described hereinafter.

At first, the control circuit 24 outputs a signal for selecting the Group signals (2) to the variable-frequency oscillator 19 so that the signal with the frequency H2[Hz] is output at output terminal 19H and the signal with the frequency K2[Hz] is output at output terminal 19K. The control circuit 24 controls the respective operating speeds of the CCD driver 20, the A/D converter 21 and the storage device 22 simultaneously based on the frequency of the signal which is output at the output terminal 19K. The control circuit 24 controls the variable-frequency oscillator 19 to control the rotation of the color filter unit 13 based on the frequency of the signal which is output at the output terminal 19H.

The red, green and blue images of the object 10 are focused on the CCD 12 by the lens system 11 sequentially as the color filter unit 13 is rotated. The magnitude of the output signal of the CCD 12 is dependent on the characteristics of the CCD 12, as shown in FIG. 4, and the duration of reception of the color image. The output signal of the CCD 12 is converted into a corresponding digital signal by the A/D converter 21 and then the digital signal is given to the storage device 22 and the control circuit 24. The control circuit 24 monitors the luminance of the input color image data on the basis of the digital signal output by the A/D converter 21 and discriminates the overflow range, the high range, and the low range by comparing the input color image data digital signal output (DSO) with the discriminating data (DD) representing the points A1 and B1.

If the luminance is in the overflow range, that is, the input color image data DSO is greater than DD for the point A1, the control circuit 24 controls the variable-frequency oscillator 19 so that the frequency of the signal output by the variable-frequency oscillator 19 increases. That is, the control circuit 24 outputs a signal for selecting the Group signals (3) to the variable-frequency oscillator 19 so that the signal with the frequency H3[Hz] is output at output terminal 19H and the signal with the frequency K3[Hz] is output at output terminal 19K.

The rotating speed of the color filter unit 13 increases with the increase of the frequency of the output signal that is output at the output terminal 19H. Since the output terminal 19K of the variable-frequency oscillator 19 is connected to the CCD driver 20, the A/D converter 21 and the storage device 22 (FIG. 1) commonly, the speed of operation of the CCD 12, the A/D converter 21 and the storage device 22 increases with the increase of the frequency of the output signal that is output at the output terminal 19K.

If the frequency of the output signal that is output by the variable-frequency oscillator increases, the following changes occur in synchronism with the frequency of the output signal:

(1) data sampling period at which the output of the CCD 12 is sampled is reduced so that the output signal of the CCD 12 is in the linear range;

(2) A/D conversion of the A/D converter 21 increases;

(3) data write speed at which the output signal of the A/D converter 21 is written in the storage device 22 increases based on the frequency of the signal applied to the write clock terminal of the storage device 22; and (4) rotating speed of the color filter unit 13 increases.

If the frequency of the signal output at the terminal 19H of the variable-frequency oscillator 19 increases, the rotating speed of the color filter unit 13 increases, so that the period of time of reception of each color image (integral time) is decreased and the magnitude of the output signal of the CCD 12 decreases even if the luminance on the CCD 12 is unchanged. Consequently, the brightness of the input image is reduced.

Next, if the control circuit 24 outputs the signal for selecting the Group signals (2) to the variable-frequency oscillator 19 and the luminance is in the low range (FIG. 4), that is, the input color image data DSO is less than the DD for point B1, the control circuit 24 controls the variable-frequency oscillator 19 so that the frequency of the signal output by the variable-frequency oscillator 19 decreases. That is, the control circuit 24 outputs a signal, for selecting the Group signals (1), to the variable-frequency oscillator 19 so that the signal with the frequency H1[Hz] is output at the output terminal 19H and the signal with the frequency K1[Hz] is output at output terminal 19K.

The control circuit 24 controls the variable-frequency oscillator 19 to control the respective operating speeds of the CCD driver 20, the A/D converter 21 and the storage device 22 simultaneously based on the frequency of the signal which is output at the output terminal 19K of the variable-frequency oscillator 19. The control circuit 24 controls the variable-frequency oscillator 19 to control the rotation of the color filter unit 13 based on the frequency of the signal which is output at the output terminal 19H of the variable-frequency oscillator 19.

If the frequency of the variable-frequency oscillator 19 decreases, the rotating speed of the color filter unit 13 decreases, so that the period of time of reception of each color image is increased and the magnitude of the output signal of the CCD 12 increases. Consequently, the brightness of the input image is enhanced.

If the frequency of the output signals that are output at the output terminals 19K and 19H decreases, changes reverse to those in (1), (2), (3) and (4) above occur.

It is evident from the foregoing description that the images are written accurately in the storage device regardless of the rotating speed of the color filter unit 22 because the control circuit 24 varies the respective operating speeds of the CCD 12, the A/D converter 21 and the storage device 22 in addition to the rotating speed of the color filter unit 13.

Figure 10:
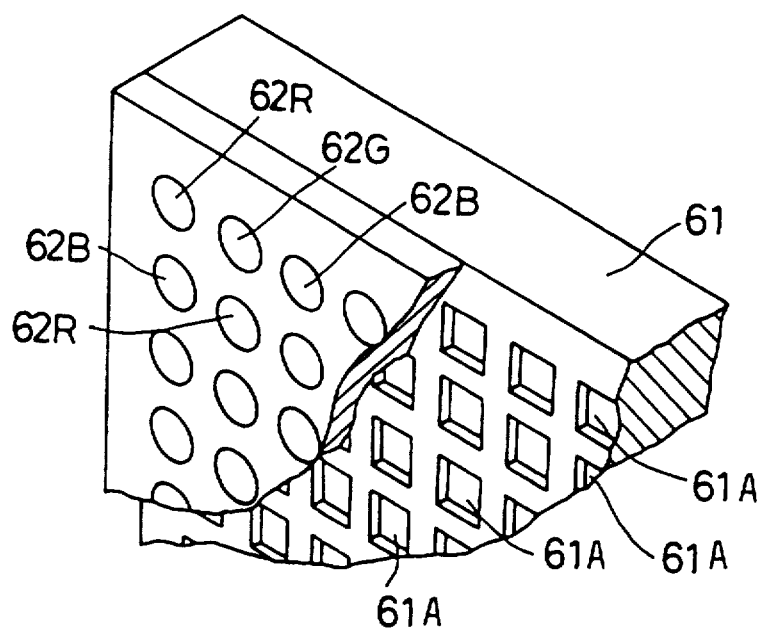
FIG. 10 is a fragmentary perspective view of a conventional image pickup device.
Figure 11:
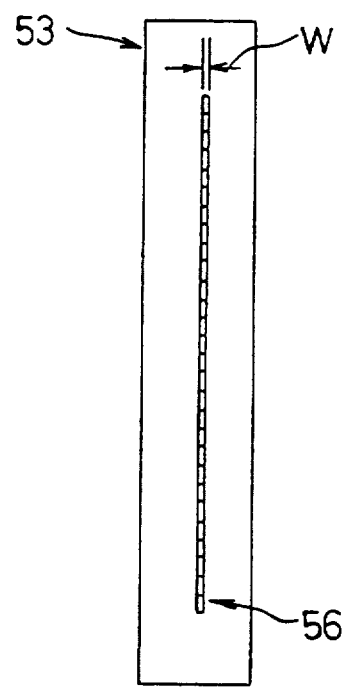
FIG. 11 is a plan view of a CCD provided with image pick up elements.

Thus, the image input operation can be completed in a short time because the color filter unit 13 is rotated at a higher rotating speed for a brighter environment. Further, the resolution of the image pickup apparatus in reading a color image is not reduced to one-third the resolution in reading a black-and-white image, as shown in FIG. 10, because the image sensing elements 12A are not divided equally for the red, green and blue images.

Figure 5:
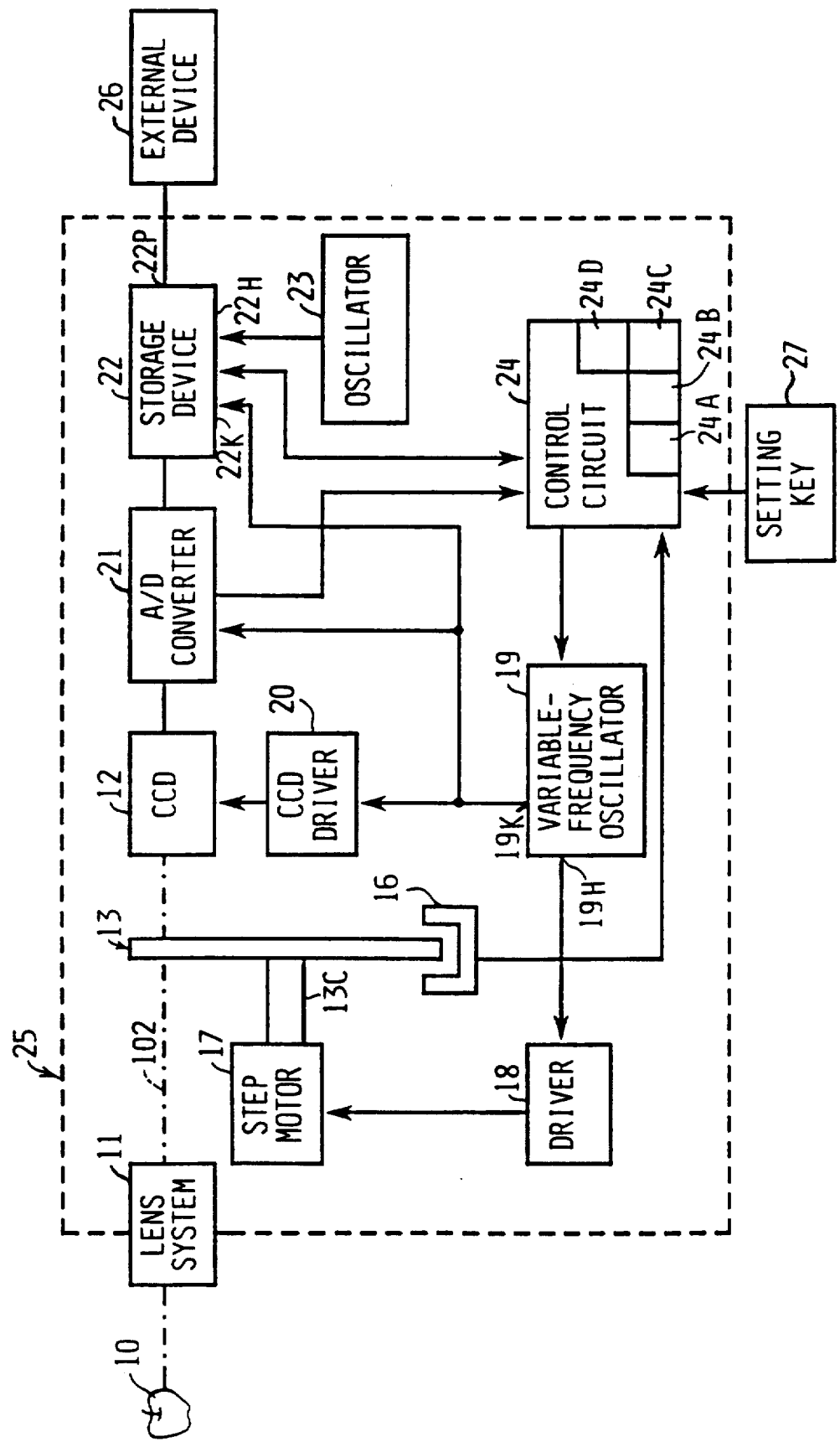
FIG. 5 is a block diagram of a second embodiment of an image pickup apparatus of the invention.
Figure 6A:
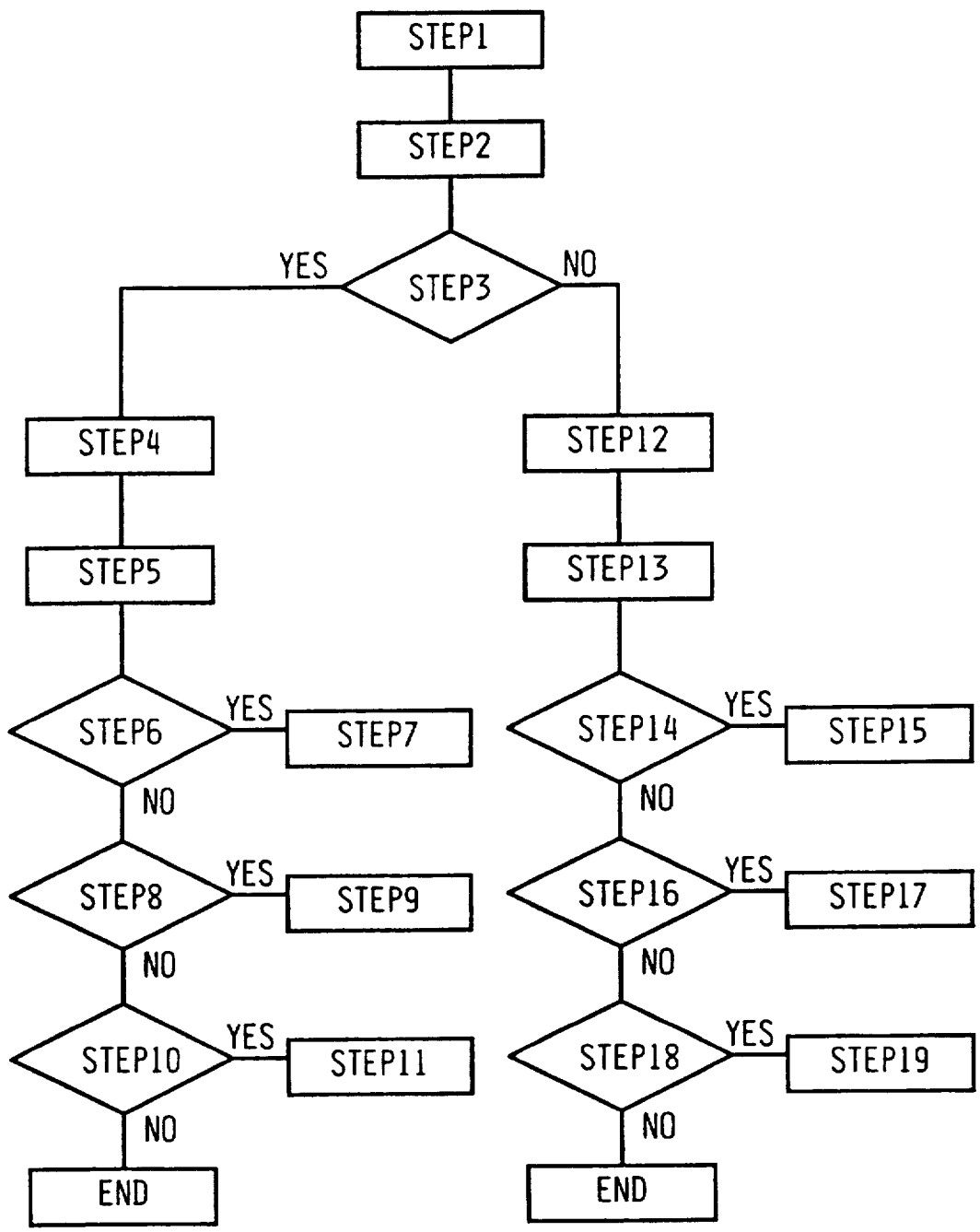
Figure 8:
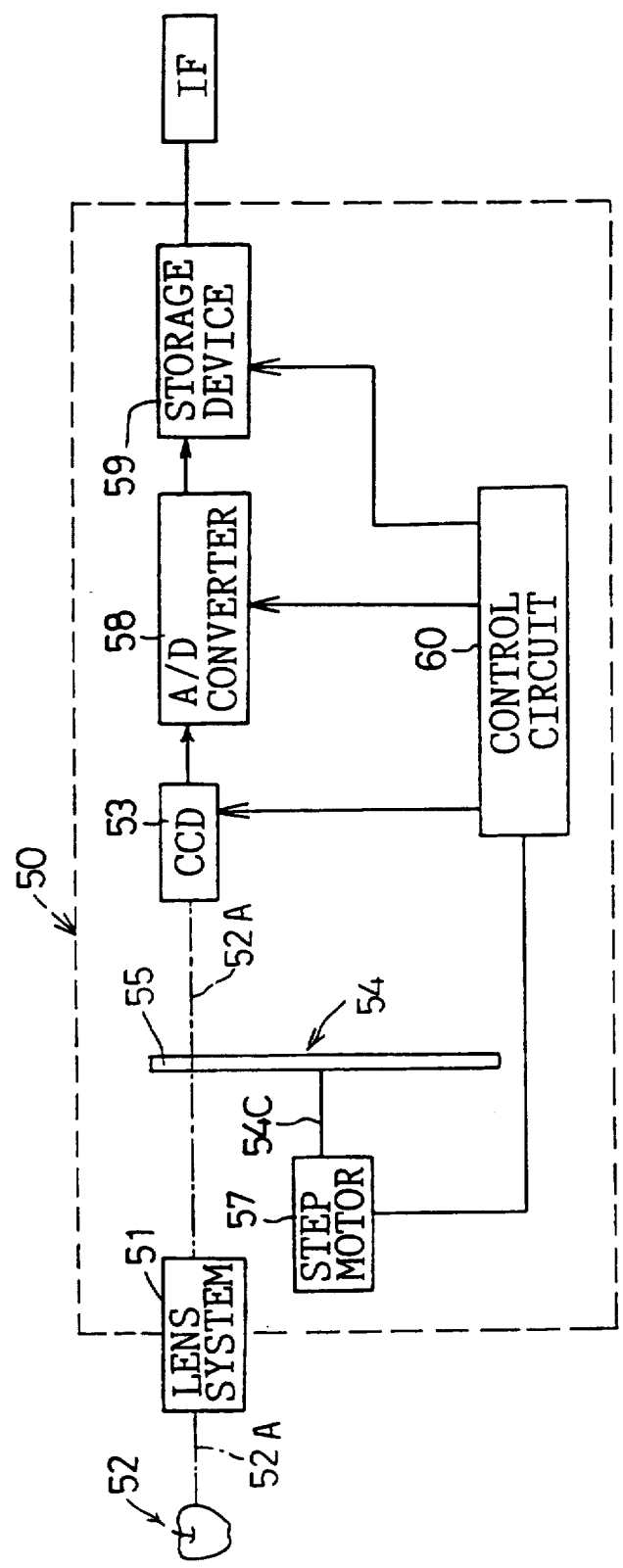
FIG. 8 is a block diagram of a conventional image pickup apparatus.
Figure 9:
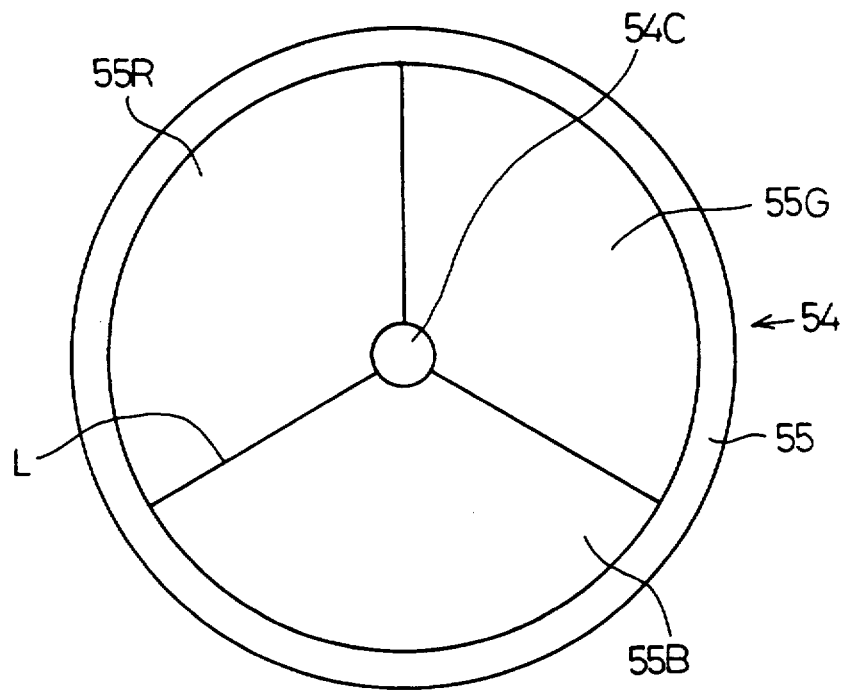
FIG. 9 is a plan view of a conventional color filter unit.

The image pickup apparatus of a second embodiment of the invention, shown in FIGS. 5 and 6, differs from the image pickup apparatus of the first embodiment only in a part of the control procedure and a setting key 27 for setting one of a color image signal generating mode (a base mode) and a black-and-white image signal generating mode which is electrically connected to the control circuit 24. The setting key 27 functions as a setting means. Therefore the description of the apparatus structure and those parts of the control procedure that are the same as that in the first embodiment will be omitted for the sake of brevity.

The image pickup apparatus of the second embodiment has a control circuit 24 that operates in either a color image pickup mode or a black-and-white image pickup mode. The control circuit 24 controls the variable-frequency oscillator 19 so that the step motor 17 operates at a rotating speed n for reading a color image and at a rotating speed 3n for reading a black-and-white image.

The operating speed control operation of the control circuit 24 is determined on the basis of the setting key 27 as shown in FIG. 6. At first, the control circuit 24 outputs a signal for selecting the Group signals (2) (STEP 1). The control circuit 24 detects the condition of the setting key 27 (STEP 2). When operation of the setting key 27 ,indicates a color image signal generating mod, or base mode, (YES at Step 3), the color image signal generating mode of the control circuit 24 operates as follows.

The control circuit 24 monitors the magnitude of the digital signal output by the A/D converter 21 (STEP 4). The control circuit 24 compares the magnitude of the current digital signal (DSO) with the magnitude of the discriminating data (STEP 5). When the control circuit 24 discriminates the light intensity data corresponding to the overflow range (STEP 6), the control circuit 24 outputs a signal for selecting the Group signals (3) to the variable-frequency oscillator 19 so that the signal with the frequency H3[Hz] is output at output terminal 19H and the signal with the frequency K3[Hz] is output at output terminal 19K (STEP 7).

When the control circuit 24 discriminates the light intensity data corresponding to the high range (STEP 8), the control circuit 24 outputs a signal for selecting the Group signals (2) to the variable-frequency oscillator 19 so that the signal with the frequency H2[Hz] is output at output terminal 19H and the signal with the frequency K2[Hz] is output at output terminal 19K (STEP 9). When the control circuit 24 discriminates the light intensity data corresponding to the low range (STEP 10), the control circuit 24 outputs a signal for selecting the Group signals (1) to the variable-frequency oscillator !9 so that the signal with the frequency H1[Hz] is output at output terminal 19H and the signal with the frequency K1[Hz] is output at output terminal 19K (STEP 11).

When operation of the setting key 27 setting indicates a black-and-white image pickup mode (NO at STEP 3), the black-and-white image pickup mode of the control circuit 24 operates as follows.

The control circuit 24 monitors the magnitude of the digital signal output (DSO) by the A/D converter 21 (STEP 12). The control circuit 24 compares the magnitude of the current digital signal (DSO) with the magnitude of the discriminating data (STEP 13). When the control circuit 24 discriminates the light intensity data corresponding to the overflow range (STEP 14), the control circuit 24 outputs a signal for selecting the Group signals (6) to the variable-frequency oscillator 19 so that the signal with the frequency H3[Hz] is output at output terminal 19H and the signal with the frequency 3*K3[Hz] is output at output terminal 19K (STEP 15). When the control circuit 24 discriminates the light intensity data corresponding to the high range (STEP 16), the control circuit 24 outputs a signal for selecting the Group signals (5) to the variable-frequency oscillator 19 so that the signal with the frequency H2[Hz] is output at output terminal 19H and the signal with the frequency 3*K2[Hz] is output at output terminal 19K (STEP 17). When the control circuit 24 discriminates the light intensity data corresponding to the low range (STEP 18), the control circuit 24 outputs a signal for selecting the Group signals (4) to the variable-frequency oscillator 19 so that the signal with the frequency H1[Hz] is output at output terminal 19K and the signal with the frequency 3*K1[Hz] is output at output terminal 19H (STEP 19).

Figure 12:
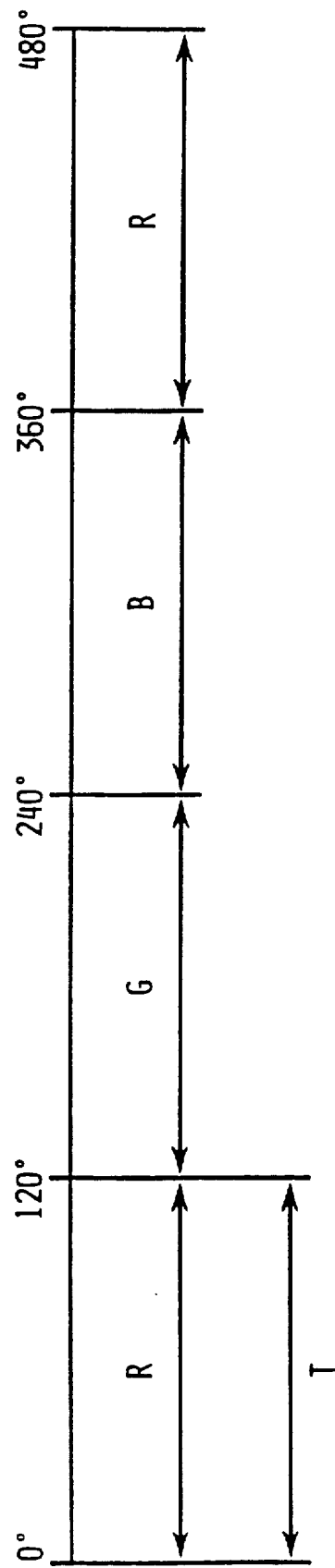
FIG. 12 is a diagram of the color image reading operation of a color image reading apparatus.

The data for a color image is obtained when the time T is equal to the time required for turning the color filter unit 13 through an angle of 120° in reading a color of the image, as shown in FIG. 12, i.e. a time 3T passes for integration of the color image. In reading a black-and-white image, with reference to FIG. 7, the total time T for integration is equal to the time T for reading a single color of a color image, and the rotating speed of the color filter unit 13 is 3n (n is the rotating speed of the color filter unit 13 in reading a color of a color image). As shown in FIG. 7, the color filter unit 13 turns one full turn in the time T for integration in reading a black-and-white image. Therefore, red, green and blue image signals are added, namely, red, green and blue images are mixed, to provide an accurate black-and-white image.

As is apparent from the foregoing description, the image pickup apparatus in the second embodiment takes red, green and blue images in the time T for integration in which one of the three color images is to be taken and, consequently, the CCD 12 is able to receive a sufficient quantity of light for the red, green and blue images so that the red, green and blue images can accurately be taken and mixed to obtain an accurate black-and-white image.

The CCD 12, i.e., the linear image sensor, employed in the foregoing embodiments of the present invention may be replaced by an area image sensor. The color filter unit 13 having the shape of a disk may be replaced by a parallel arrangement of rectangular color filters. Further, the color filter unit 13 having the shape of a disk and provided with three sectorial color filters having equal central angles of 120° may be replaced by a color filter unit having the shape of a disk and provided with three sectorial color filters, respectively, having different central angles.

While this invention has been described in connection with specific embodiments thereof, it is evident that many alternative modifications and variations, such as those identified above, will be apparent to those skilled in the art. Accordingly, the preferred embodiments of the invention as set forth herein are intended to be illustrative, not limitative. Various changes may be made without departing from the spirit and scope of the invention as defined in the following claims.

What is claimed is:

1. An image pickup apparatus comprising:
   an image pickup means for receiving light thereon and for generating electric signals corresponding to integrals of luminances of the light with respect to time and for outputting the electric signals;
   a color filter unit including at least two different color filters which are respectively disposed on an optical path of light falling on said image pickup means;
   a moving means for moving said color filter unit relative to said image pickup means to locate the color filters sequentially on the optical path; and
   a control means for controlling said moving means to vary a moving speed of said color filter unit based on an environmental illumination level.

2. The image pickup apparatus as claimed in claim 1, wherein said control means is electrically connected to said image pickup means so that said control means monitors a magnitude of the electric signals to detect the environmental illumination level.

3. The image pickup apparatus as claimed in claim 1, wherein said control means further comprises variable-frequency oscillator which is electrically connected to said moving means to vary the moving speed of the color filter unit.

4. An image pickup apparatus comprising:
   an image pickup means for receiving light thereon and for generating electric signals corresponding to integrals of luminances of the light with respect to time and for outputting the electric signals;
   a color filter unit including red, green, blue color filters which are respectively disposed on an optical path of light falling on said image pickup means;
   a moving means for moving said color filter unit relative to said image pickup means to locate the color filters sequentially on the optical path;
   a mode setting means for setting one of a color image signal generating mode and a black-and-white image signal generating mode; and
   a control means for controlling said moving means so that said color filter unit is moved at a first speed n when the color image signal generating mode is set by said mode setting means and at a second speed 3n, n being a positive integer, times the first speed when the black-and-white image signal generating mode is set by the said mode setting means.

5. An image pickup apparatus comprising:
   an image pickup means for receiving light thereon and outputting an electronic signal corresponding to a level of the light received with respect to time;
   a color filter unit including at least two different color filters which are disposed on an optical path or falling on said image pickup means;
   a moving means for moving said color filter unit relative to said image pickup means to sequentially locate said at least two different color filters sequentially on the optical path; and
   a control means for controlling said moving means to vary a moving speed of said color filter unit based on the electric signal output by said image pickup means when operated in a base mode, said electric signal providing a measure of luminance.

6. The image pickup apparatus as claimed in claim 5, wherein said at least two different color filters comprise red, green and blue filters.

7. The image pickup apparatus as claimed in claim 5, wherein said control means compares said electric signal from said image pickup means in the base mode to discriminating data to determine whether the luminance is in one of a condition of overflow, high range and low range luminance.

8. The image pickup apparatus as claimed in claim 7, further comprising a mode setting means for setting one of a color image signal generating mode and a back and white image signal generating mode, said color image signal generating mode being the base mode.

9. The image pickup apparatus as claimed in claim 8, wherein said control means controls said moving means so that said color filter unit is moved at a first speed when the color image signal generating mode is set by said mode setting means and at a second speed when the black and white image signal generating mode is set nu said mode setting means.

10. The image pickup apparatus as claimed in claim 9, where said second speed is three times as great as said first speed.

11. The image pickup apparatus as claimed in claim 10, wherein said first speed and said second speed are a function of whether the level of luminance is an overflow level, a high range level, or in a low range level.

12. The image pickup apparatus as claimed in claim 1, wherein the image pickup means further comprises a charge coupled means which receives light thereon and generates electric signals corresponding to integrals of luminances of the light with respect to time and outputs analog electric signals.

13. The image pickup apparatus as claimed in claim 12, wherein the charge coupled means is electrically connected to an analog-to-digital converting means so that the analog-to-digital converting means converts analog electric signals output by the charge coupled means into digital signals.

14. The image pickup apparatus as claimed in claim 13, wherein the analog-to-digital converting means is electrically connected to a storing means so that the digital signals output by the analog-to-digital converting means is output to the storing means.

15. The image pickup apparatus as claimed in claim 14, wherein the control means controls the charge coupled means, the analog-to-digital converting means and the storing means to vary operational speeds of the charge coupled means, the analog-to-digital converting means and the storing means based on the environmental illumination level.

* * * * *